United States Patent
Chakrabarti et al.

(10) Patent No.: US 9,497,100 B2
(45) Date of Patent: Nov. 15, 2016

(54) METHODS, SYSTEMS, AND COMPUTER READABLE MEDIA FOR PROVIDING FUZZ TESTING FUNCTIONALITY

(71) Applicant: Ixia, Calabasas, CA (US)

(72) Inventors: Pinaki Chakrabarti, North Hollywood, CA (US); Alok Srivastava, Woodland Hills, CA (US); Deepesh Arora, Thousand Oaks, CA (US)

(73) Assignee: IXIA, Calabasas, CA (US)

( * ) Notice: Subject to any disclaimer, the term of this patent is extended or adjusted under 35 U.S.C. 154(b) by 178 days.

(21) Appl. No.: 14/270,333

(22) Filed: May 5, 2014

(65) Prior Publication Data

US 2015/0319072 A1    Nov. 5, 2015

(51) Int. Cl.
    *H04L 12/26*    (2006.01)
(52) U.S. Cl.
    CPC .................................... *H04L 43/50* (2013.01)
(58) Field of Classification Search
    USPC ......................................................... 714/25
    See application file for complete search history.

(56) References Cited

U.S. PATENT DOCUMENTS

| | | | |
|---|---|---|---|
| 6,988,208 B2 | 1/2006 | Hrabik et al. |
| 7,735,141 B1 | 6/2010 | Noel et al. |
| 7,818,788 B2 | 10/2010 | Meier |
| 7,926,114 B2 | 4/2011 | Neystadt et al. |
| 8,407,798 B1 | 3/2013 | Lotem et al. |
| 8,745,592 B1 * | 6/2014 | Ormandy ............ G06F 11/3684 717/124 |
| 8,819,834 B2 | 8/2014 | Petrica et al. |
| 2004/0025015 A1 | 2/2004 | Satterlee et al. |
| 2004/0250124 A1 | 12/2004 | Chesla et al. |
| 2005/0235263 A1 | 10/2005 | Bundy et al. |
| 2007/0006041 A1 | 1/2007 | Brunswig et al. |
| 2007/0192863 A1 | 8/2007 | Kapoor et al. |
| 2008/0095102 A1 | 4/2008 | Meng et al. |
| 2008/0262990 A1 | 10/2008 | Kapoor et al. |

(Continued)

FOREIGN PATENT DOCUMENTS

| | | |
|---|---|---|
| WO | WO 2013/087982 A1 | 6/2013 |
| WO | WO 2013/192086 A1 | 12/2013 |

OTHER PUBLICATIONS

Notice of Allowance and Fee(s) Due for U.S. Appl. No. 13/527,565 (Apr. 25, 2014).

(Continued)

*Primary Examiner* — Kamini Patel
(74) *Attorney, Agent, or Firm* — Jenkins, Wilson, Taylor & Hunt, P.A.

(57) ABSTRACT

Methods, systems, and computer readable media for providing fuzz testing functionality are disclosed. According to one method, the method includes at a fuzz testing module (FTM), generating a plurality of test messages, including a test message including fuzzed data, generating fuzzed message identification information, and transmitting the test message and the fuzzed message identification information to a device under test (DUT). The method also includes at a packet analyzer located between the FTM and the DUT, receiving the plurality of test messages and the fuzzed message identification information, and identifying the test message including the fuzzed data using the fuzzed message identification information.

18 Claims, 9 Drawing Sheets

(56) References Cited

U.S. PATENT DOCUMENTS

| | | | | |
|---|---|---|---|---|
| 2008/0288822 | A1* | 11/2008 | Wu | G06F 21/577 714/32 |
| 2008/0301647 | A1* | 12/2008 | Neystadt | G06F 11/3672 717/127 |
| 2008/0301813 | A1* | 12/2008 | Neystadt | G06F 11/3672 726/25 |
| 2008/0320328 | A1* | 12/2008 | O'Leary | G06F 21/57 714/25 |
| 2009/0077666 | A1 | 3/2009 | Chen et al. | |
| 2009/0083854 | A1* | 3/2009 | Bozanich | H04L 63/1433 726/23 |
| 2009/0252046 | A1 | 10/2009 | Canright et al. | |
| 2009/0327943 | A1* | 12/2009 | Medvedev | G06F 21/577 715/772 |
| 2009/0328190 | A1 | 12/2009 | Liu et al. | |
| 2010/0058475 | A1* | 3/2010 | Thummalapenta | H04L 63/1433 726/25 |
| 2010/0100871 | A1* | 4/2010 | Celeskey | G06F 11/3688 717/124 |
| 2011/0078798 | A1* | 3/2011 | Chen | G06F 21/577 726/25 |
| 2011/0214157 | A1 | 9/2011 | Korsunsky et al. | |
| 2011/0302455 | A1* | 12/2011 | Thomas | G06F 11/3636 714/45 |
| 2012/0084756 | A1 | 4/2012 | Subramanian et al. | |
| 2012/0089868 | A1* | 4/2012 | Meijer | G06F 11/076 714/26 |
| 2013/0259370 | A1 | 10/2013 | Tang | |
| 2013/0340083 | A1* | 12/2013 | Petrica | G06F 11/263 726/25 |
| 2014/0047275 | A1* | 2/2014 | Eddington | G06F 11/0766 714/37 |

OTHER PUBLICATIONS

Final Office Action for U.S. Appl. No. 13/527,565 (Jan. 3, 2014).
"Wireshark," http://web.archive.org/web/20131231064122/http://en.wikipedia.org/wiki/Wireshark, pp. 1-6 (Dec. 2013).
Notification of Transmittal of the International Search Report and the Written Opinion of the International Searching Authority, or the Declaration for International Application No. PCT/US2013/046129 (Nov. 8, 2013).
Non-Final Office Action for U.S. Appl. No. 13/527,565 (Jul. 30, 2013).
"IxNetwork," http://www.ixiacom.com/products/ixnetwork, PN: 915-3003-01, Rev. B., pp. 1-4 (May 2011).
Gorbunov et al., "AutoFuzz: Automated Network Protocol Fuzzing Framework", International Journal of Computer Science and Network Security, vol. 10, No. 8, pp. 239-245 (Aug. 2010).
Abdelnur et al., "KiF: A stateful SIP Fuzzer", Proceedings of the 1st international conference on Principles, systems and applications of IP telecommunications, pp. 47-56 (2007).
Banks et al., "SNOOZE: Toward a Stateful NetwOrk prOtocol fuzZEr", Information Security, pp. 343-358 (2006).
Allen et al., "A Model-based Approach to the Security Testing of Network Protocol Implementations," IEEE, Department of Computer Sciences, Florida Institute of Technology, pp. 1-8 (Copyright 2006).
Screenshot of antiparser, antiparser.sourceforge.net (Aug. 17, 2005).
Aitel, "An Introduction to SPIKE, the Fuzzer Creation Kit", Immunity Inc., White Paper, pp. 1-32 (2004).
Screenshot of Autodafé, an Act of Software Torture, autodafe.sourceforge.net (Copyright 2004-2006).
Wieser et al. "Security testing of SIP implementations", Technical Report, Columbia University, Department of Computer Science, pp. 1-7 (2003).
Amini et al., "Sulley: Fuzzing Framework", www.fuzzing.org/wp-content/SulleyManual.pdf (Publication Date Unknown).
Screenshot of VDA Labs, www.vdalabs.com/tools/efs_gpf.html (Publication Date Unknown).
Screenshot of Peach Fuzzing Platform, peachfuzzer.com (Publication Date Unknown, downloaded from the Internet Aug. 17, 2012).
Notification of Transmittal of the International Search Report and the Written Opinion of the International Searching Authority, or the Declaration for International Application No. PCT/US2015/029225 (Aug. 10, 2015).
Commonly-assigned, co-pending U.S. Appl. No. 14/659,309 for "Methods. Systems, and Computer Readable Media for Converging on Network Protocol Stack Vulnerabilities Using Fuzzing Variables, Vulnerability Ratings and Progressive Convergence," (Unpublished, filed Mar. 16, 2015).
Commonly-assigned, co-pending U.S. Appl. No. 14/658,860 for "Methods, Systems, and Computer Readable Media for Simplistic Visual Representation of Complex Interdependent Network Protocol Fields for Network Protocol Fuzzing and Graphical Framework for Reporting Instantaneous System Level Progress," (Unpublished filed Mar. 16, 2015).
Householder et al., "Probability-Based Parameter Selection for Black-Box Fuzz Testing," Software Engineering Institute, Technical Note, CMU/SEI-2012-TN-019, 30 pgs. (Aug. 2012).
Comer, "Internetworking with TCP/IP, vol. 1: Principles, Protocols, and Architecture," Third Edition, pp. 203-204, (1995).
Notice of Allowance and Fee(s) Due and Examiner-Initiated Interview Summary for U.S. Appl. No. 14/659,309 (Apr. 29, 2016).

* cited by examiner

| TEST ID | TEST OBJECTIVE(S) | LATEST TRANSACTION/ MESSAGE ID | STATISTICS | % COMPLETED | TIME ELASED/ TIME LEFT |
|---|---|---|---|---|---|
| 1 | MAX RTP SESSIONS | MSG 4564 | 700 RTP SESSIONS; 1 FAILURE – MSG 3523; FUZZ PARAMETER(S) A, B, C | 17 | 5:05/24:55 |
| 2 | MAX UDP THROUGHPUT | MSG 9994 | 30,000 UDP PACKETS PER SECOND; 10 FAILURES...; FUZZ PARAMETER(S) A, B, D | 37 | 5:40/9:20 |
| 3 | MAX TCP CONCURRENT SESSIONS | TRANS 463 | 250 CONCURRENT SESSION; 3 FAILURES...; FUZZ PARAMETER(S) E | 27 | 15:55/44:01 |
| 4 | 100 COMPLETED TRANSACTIONS | TRANS 83 | 81 TRANSACTIONS COMPLETED; 2 FAILURES...; FUZZ PARAMETER(S) A, F | 81 | 12:30/2:30 |

METHODS, SYSTEMS, AND COMPUTER READABLE MEDIA FOR PROVIDING FUZZ TESTING FUNCTIONALITY

TECHNICAL FIELD

The subject matter described herein relates to device testing. More specifically, the subject matter relates to methods, systems, and computer readable media for providing fuzz testing functionality.

BACKGROUND

When testing computing and/or networking equipment, it is important to make sure that testing mimics real world scenarios and conditions. For example, when testing a router or server, it may be necessary to generate test traffic similar to real traffic including valid and invalid traffic. Fuzz testing or fuzzing is a testing technique that involves providing invalid, unexpected, and/or random data to one or more device(s) under test (DUT) or software therein. During testing, the DUT may be monitored to identify issues or problems associated with the fuzzed data. For example, a testing platform may send invalid, unexpected, and/or malformed packets to a DUT and may monitor the DUT for problems, such as crashes, failing built-in code assertions, or other unwanted behavior.

Conventional testing platforms have issues performing, managing, and/or analyzing fuzz testing. For example, a conventional testing platform may have difficulty continuing fuzz testing when a DUT experiences problems and/or may be unable to determine if and when fuzzed data actually caused the DUT to experience problems.

Accordingly, in light of these difficulties, a need exists for improved methods, systems, and computer readable media for providing fuzz testing functionality.

SUMMARY

Methods, systems, and computer readable media for providing fuzz testing functionality are disclosed. According to one method, the method includes at a fuzz testing module (FTM), generating a plurality of test messages, including a test message including fuzzed data, generating fuzzed message identification information, and transmitting the test message and the fuzzed message identification information to a device under test (DUT). The method also includes at a packet analyzer located between the FTM and the DUT, receiving the plurality of test messages and the fuzzed message identification information, and identifying the test message including the fuzzed data using the fuzzed message identification information.

According to one system, the system includes a FTM configured to generate a plurality of test messages, including a test message including fuzzed data, to generate fuzzed message identification information, and to transmit the plurality of test messages and the fuzzed message identification information to a DUT. The system also includes a packet analyzer located between the FTM and the DUT. The packet analyzer is configured to receive the plurality of test messages and the fuzzed message identification information and to identify the test message including the fuzzed data using the fuzzed message identification information.

The subject matter described herein may be implemented in software in combination with hardware and/or firmware. For example, the subject matter described herein may be implemented in software executed by a processor. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

As used herein, the term "node" refers to a physical computing platform including one or more processors and memory.

As used herein, the terms "function" or "module" refer to hardware, firmware, or software in combination with hardware and/or firmware for implementing features described herein.

BRIEF DESCRIPTION OF THE DRAWINGS

The subject matter described herein will now be explained with reference to the accompanying drawings of which.

DETAILED DESCRIPTION

The subject matter described herein includes methods, systems, and computer readable media for providing fuzz testing functionality. When testing one or more network resources, it may be desirable to test the resources under non-trivial load conditions that mirror or closely approximate real world scenarios.

In accordance with some aspects of the subject matter described herein, a computing platform (e.g., a testing platform, a device, or a node) or a module (e.g., a field-programmable gateway array (FPGA), an application-specific integrated circuit (ASIC), or software executing on a processor) may be configured to provide fuzz testing functionality. For example, a test message, such as a frame, a packet, a datagram, a user datagram protocol (UDP) packet, a transport control protocol (TCP) packet, or a protocol data unit (PDU), may include fuzzed data. In this example, fuzzed data may include one or more parameter values (e.g., in a header portion of the test message) and/or user data that is random, invalid, or unexpected data. In some embodiments, test messages that include fuzzed data may conform to a specific protocol and/or may otherwise appear normal or valid. In some embodiments, test messages that include fuzzed data may not conform to a specific protocol and/or may otherwise appear abnormal or invalid.

Conventional testing platforms cannot point to or identify fuzzed packets or frames unambiguously and accurately. For example, a network protocol analyzer or other testing platform may identify some high level errors, such as a wrong checksum, but generally cannot identify fuzzed packets or frames, e.g., if the content is valid with regard to relevant protocol definitions. Further, a network protocol analyzer generally lacks functionality for identifying packets or frames that disobey protocol state machine transitions, unless the network protocol analyzer is aware of protocol state machine transitions. Moreover, a network protocol analyzer is incapable of identifying fuzzed packets or frames if the fuzzed packets or frames are encrypted. Hence, conventional testing platforms, like network protocol analyzers, are generally not capable of efficiently identifying fuzzed packets or frames.

In accordance with some aspects of the subject matter described herein, a computing platform or module may be configured to identify a test message that includes fuzzed data. For example, indication information or fuzzed message identification information may be generated that corresponds to a test message and may be included in the test message or in a separate indication message. In this example, the indication message may be sent immediately before or after the test message and may include information for identifying or indicating a test message is a test message, e.g., by a network protocol analyzer, packet capture software (e.g., Wireshark®), or a similar entity.

Conventional testing platforms cannot quickly or easily reproduce or replay test related events. For example, a test operator may execute fuzz testing of a DUT. In this example, the test operator may detect a problem around a fifty minute mark of a sixty minute test and may want to re-run or further study this problem. With conventional testing platforms, the test operator may be required to restart the test from the beginning. However, restarting the test from the beginning wastes resources and time since the test operator may be only interested in the last ten minutes of the test.

In accordance with some aspects of the subject matter described herein, a computing platform or module may be configured to store state information and/or related testing information for reproducing or replaying test related events. For example, during testing of a DUT, state information, such as fuzzed parameters, timestamps, test objectives, and/or other information for replaying test related events, may be periodically stored. In this example, the stored information may be usable to perform a test from any saved point in time, e.g., rewinding or fast-forwarding a test to a particular point of interest.

Fuzz testing can involve generating a large number of fuzzed messages. For example, fuzz testing may involve fuzzing numerous combinations of Ethernet header parameters and/or user data of messages to a DUT. Conventional testing platforms can require substantial physical resources (e.g., memory and processing resources) and significant time to complete fuzz testing of a DUT. Further, conventional testing platforms can get impacted by a DUT's unexpected behavior and fail. If such conventional testing platforms are incapable of handling DUT failures by continuing with the fuzz testing instead of aborting the test and restarting, then the impact of such failures may hinder efficient resource utilization and may increase the time required to complete fuzz testing of a DUT.

In accordance with some aspects of the subject matter described herein, a computing platform or module may be configured to assign portions of fuzz testing among a plurality of resources, e.g., ports or processors. For example, during testing of a DUT, a first test portion may be assigned to a first test port for communication to the DUT and a second test portion may be assigned to a second test port for communication to the DUT. In this example, each port may perform testing independently from the other port. If one of the ports fails, the test portion (or an uncommunicated or unexecuted portion of the test portion) may be reassigned to an available test port. If a failed test port is later re-initialized (e.g., becomes capable of performing testing), a test portion may be assigned to the re-initialized test port. By using multiple resources when performing fuzz testing, a computing platform or module in accordance with some aspects of the subject matter described herein can be resistant to failures and can more quickly complete fuzz testing of a DUT as compared to conventional testing platforms.

Reference will now be made in detail to exemplary embodiments of the subject matter described herein, examples of which are illustrated in the accompanying drawings. Wherever possible, the same reference numbers will be used throughout the drawings to refer to the same or like parts.

Figure 1:
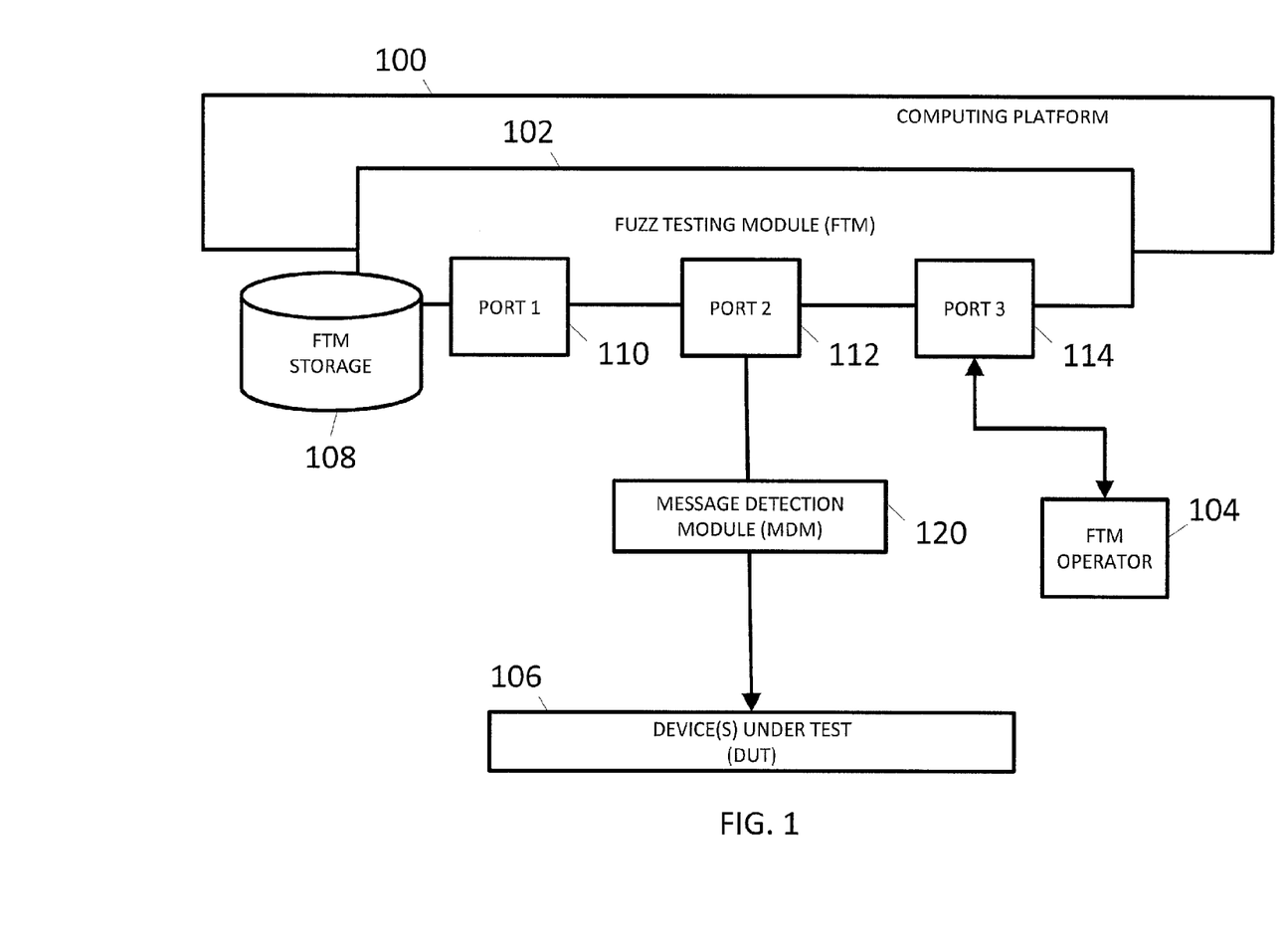
FIG. 1 is a diagram illustrating an exemplary computing platform for providing fuzz testing functionality according to an embodiment of the subject matter described herein.

FIG. 1 is a diagram illustrating an exemplary computing platform 100 for providing fuzz testing functionality according to an embodiment of the subject matter described herein. Computing platform 100 may represent any suitable entity or entities (e.g., one or more testing platforms, nodes, or devices) associated with testing one or more DUT 106. For example, computing platform 100 may generate and/or process traffic for testing DUT 106. In this example, computing platform 100 may monitor and/or analyze one or more performance aspects associated with DUT 106.

In some embodiments, computing platform 100 may be a stand-alone tool, a testing device, or software executing on a processor. In some embodiments, computing platform 100 may be a single node or may be distributed across multiple computing platforms or nodes.

In some embodiments, computing platform 100 may include one or more modules for performing various functions. For example, computing platform 100 may include a packet generation module configured to generate traffic for testing DUT 106 and/or a network node emulation module configured to emulate a node or device that communicates with DUT 106.

Computing platform 100 may include a fuzz testing module (FTM) 102. FTM 102 may be any suitable entity or entities (e.g., software executing on a processor, an ASIC, an FPGA, or a combination therein) for performing one or more aspects associated with providing fuzz testing functionality. FTM 102 may be configured to generate and/or modify various fuzzed messages for testing DUT 106. For example, FTM 102 may include functionality for generating various test messages that include fuzzed data (e.g., random, invalid, or unexpected data for testing DUT 106, e.g., parameters and/or user data). In this example, the test messages may include packets or frames that conform to one or more protocols and/or may appear normal or valid (e.g., to a network protocol analyzer). After sending test messages containing fuzzed data, FTM 102 may be configured to monitor and interact with DUT 106 and/or may determine whether DUT 106 experiences any issues associated with the test messages.

In some embodiments, fuzzed data may be generated and/or included in test messages to test various aspects of DUT 106. For example, fuzzed data may be utilized to determine whether DUT 106 has correctly implemented a particular network standard or protocol. In this example, FTM 106 may attempt to generate parameter values and/or user data that is random, invalid, atypical, or unexpected data. In another example, fuzzed data may be utilized to determine whether DUT 106 includes security flaws or bugs associated with communications. In this example, FTM 106 may attempt to generate parameter values and/or user data that cause common problems, such as buffer overflow issues or system crashes.

FTM 102 may include ports 110, 112, and 114. Each of ports 110, 112, and 114 may represent any suitable entity or entities (e.g., one or more processors and/or communications interfaces) for interacting with users and/or nodes. For example, ports 110, 112, and 114 may each represent a network interface card (NIC) or a communications interface therein for receiving and/or sending various types of data units; such as IP packets, Ethernet frames, Ethernet packets, PDUs, datagrams, UDP packets, TCP packets, IP version 4 (v4) packets, IP version 6 (v6) packets, stream control transmission protocol (SCTP) packets, real-time transport protocol (RTP) packets, or reliable data protocol (RDP) packets, packets using a tunneling protocol, and/or other data units.

In some embodiments, ports 110, 112, and/or 114 may be configured to communicate with FTM user 104. FTM user 104 may be any entity (e.g., an automated system or a device or system controlled or controllable by a human user) for selecting and/or configuring various aspects associated with performing, managing, and/or analyzing fuzz testing. For example, various user interfaces (e.g., an application user interface (API) and a graphical user interface (GUI)) may be provided for testing DUT 106, for selecting and/or implementing fuzz logic and testing techniques and/or for providing testing configuration information. Exemplary user interfaces for testing DUT 106, for selecting and/or implementing fuzz logic and testing techniques and/or for providing testing configuration information may support automation (e.g., via one or more scripting languages), a representation state transfer (REST) API, a command line, and/or a web based GUI.

In some embodiments, ports 110, 112, and/or 114 may be configured to communicate with DUT 106. DUT 106 may be any suitable entity or entities (e.g., devices, systems, or platforms) for communicating with computing platform 100 and/or for receiving and processing test messages. For example, DUT 106 may include a router, a network switch, a server, or a network controller. In another example, DUT 106 may include one or more systems and/or computing platforms, e.g., a data center or a group of servers and/or routers. In yet another example, DUT 106 may include one or more networks or related components, e.g., an access network, a core network, or the Internet.

In some embodiments, one or more algorithms and/or factors may be used to determine how many resources and/or which resources (e.g., processors and/or ports 110, 112, and/or 114) are needed to perform a particular test. For example, FTM 102 and/or another entity may attempt to utilize all available resources to perform a test as quickly as possible. In another example, FTM 102 and/or another entity may determine whether a test is conducive to distributed processing and, if so, may determine an optimal number of resources for performing the test. In another example, a number of resources for performing a test may be selected based on parameters or preferences provided by a test operator, preconfigured information, network conditions, and/or other information. For example, the test duration for a test may be inversely proportional to the number of ports being used for testing. As such, a test operator may assign additional ports to shorten the test duration.

In some embodiments, FTM 102 may include functionality for performing fuzz testing using multiple resources (e.g., processors, NICs, and/or ports 110, 112, and/or 114). For example, a test may be initiated using a test plan. A test plan may be one or more scripts, logic, or other information usable to initiate and/or perform fuzz testing based on one or more test objectives. In this example, a test plan may involve multiple transactions or messages between an emulated user and DUT 106. The transactions or messages of a test plan may include different types of fuzzed data, such as fuzzed parameter values or user data that is unexpected.

In some embodiments, a test plan or related information (e.g., configuration information) may be distributed as chunks or test portions among multiple resources (e.g., processors or test ports). Each chunk or test portion may involve related test messages that are to generated and/or sent to DUT 106. For example, each test portion may be based on a particular type of fuzzed data (e.g., parameters, user data, etc.). In another example, a test portion may be based on a particular transaction and/or emulated user or other entity.

In some embodiments, FTM 102 or another entity may assign or distribute test portions to resources for execution and/or communication to DUT 106. For example, FTM 102 may assign, to port 110, a first test portion associated with modifying a parameter 'X' in a transaction between emulated user and DUT 106. In this example, the resource may generate and/or "fuzz" a test message as indicated by the test portion and may send the test message to DUT 106. Continuing with this example, FTM 102 may also assign, to port 112, a second test portion associated with modifying a parameter in a transaction 'V' between a second emulated user and DUT 106. In this example, the resource may generate and/or "fuzz" a test message as indicated by the second test portion and may send the test message to DUT 106.

In some embodiments, after a resource has completed or almost completed communicating or executing a test portion, another test portion may be assigned or distributed to a resource for execution or communication. For example, port 110 may assigned a first test portion and port 112 may be assigned a second test portion. In this example, as port 110 finishes execution of the first test portion, a third test portion may be assigned to port 110 and as port 112 finishes execution of the second test portion, a fourth test portion may be assigned to port 112.

In some embodiments, if a resource fails to execute a test portion, the test portion or the uncompleted portion of the test portion may be reassigned to an available resource. In such embodiments, measures may be taken to bring the failed resource back into a working or functional state (e.g., re-initialization of the resource). If a failed resource is successfully re-initialized (e.g., is capable of performing testing), test portions may be assigned to the re-initialized resource. If a failed resource is unable to be successfully re-initialized (e.g., is incapable of performing testing), test portions may no longer be assigned to the resource.

In some embodiments, FTM 102 may include functionality for reproducing or replaying test related events. For example, during testing of DUT 106, FTM 102 may store state information and/or related information (e.g., a progress or restore point information). In this example, the state information may indicate completion progress, a current test portion of an overall test plan (e.g., chunk 16 of 100), or other information usable to rapidly reproduce or replay test messages or related events.

In some embodiments, FTM 102 may use the stored information to perform a test from any saved point in time. For example, a test operator may use this replay functionality and/or a binary search or other method to pinpoint or identify a particular message associated with a DUT related event (e.g., crash or failure). In another example, a test operator may determine certain times of interest during an initial test and may automate subsequent tests to execute or perform testing for these times. Hence, by using stored state information or related information to replay test events, time and resources may be conserved and, as such, test duration cycles may be shorter and more efficient.

In some embodiments, FTM 102 may include functionality for indicating and/or identifying a test message containing fuzzed data. For example, after generating a fuzzed message, FTM 102 may mark or otherwise distinguish the fuzzed message with indication information, e.g., adding an identifier, a timestamp, or other information in a payload portion of a fuzzed message, such that the fuzzed message still conforms to a relevant protocol. In contrast, conventional methods generally require adding a signature or other markings to a (e.g., header portion of a) fuzzed message such that the fuzzed message no longer conforms to a relevant protocol.

In some embodiments, FTM 102 may send or initiate sending a separate indication message immediately before or after a test message. The indication message may include indication information and/or may be usable for identifying the test message. In this example, the indication message may be a "special" message in that the indication message may be uncommon and/or easily distinguishable from test messages and other traffic. The indication message may also have little or no effect on the testing or performance of DUT 106. For example, DUT 106 may ignore and/or discard an indication message without substantial processing, e.g., by containing invalid parameter values, such as a wrong checksum value or an invalid parameter value.

In some embodiments, FTM 102 may include functionality for accessing FTM storage 108. FTM storage 108 may be any suitable entity or entities (e.g., a storage device, a non-transitory computer readable medium, and/or a storage system) for maintaining or storing information related to fuzz testing. For example, FTM storage 108 may contain state information for various tests, e.g., such as restore points, progress information, or test objective information. In another example, FTM storage 108 may contain test message identifiers (IDs), fuzzed data IDs, test IDs, and/or test configuration related information, such as test preferences and/or settings, for various tests. In some embodiments, FTM storage 108 may be located at computing platform 100, FTM 102, another node or module, or distributed across multiple platforms or devices.

In some embodiments, MDM 120 may be located between FTM 102 and DUT 106. MDM 120 may include any suitable entity (e.g., a message tap device, packet capture software, or a network protocol analyzer) for scanning, analyzing, inspecting, and/or storing one or more messages. For example, MDM 120 may be a node or software that analyzes messages on the way to or from DUT 106. In this example, a network operator may use MDM 120 and/or a related GUI to identify potential problems that occurred during fuzz testing and may identify a related test message, e.g., using indication information and/or an indication message.

It will be appreciated that FIG. 1 is for illustrative purposes and that various nodes and/or modules, locations, and/or functionality described above in relation to FIG. 1 may be changed, altered, added, or removed.

Figure 2:
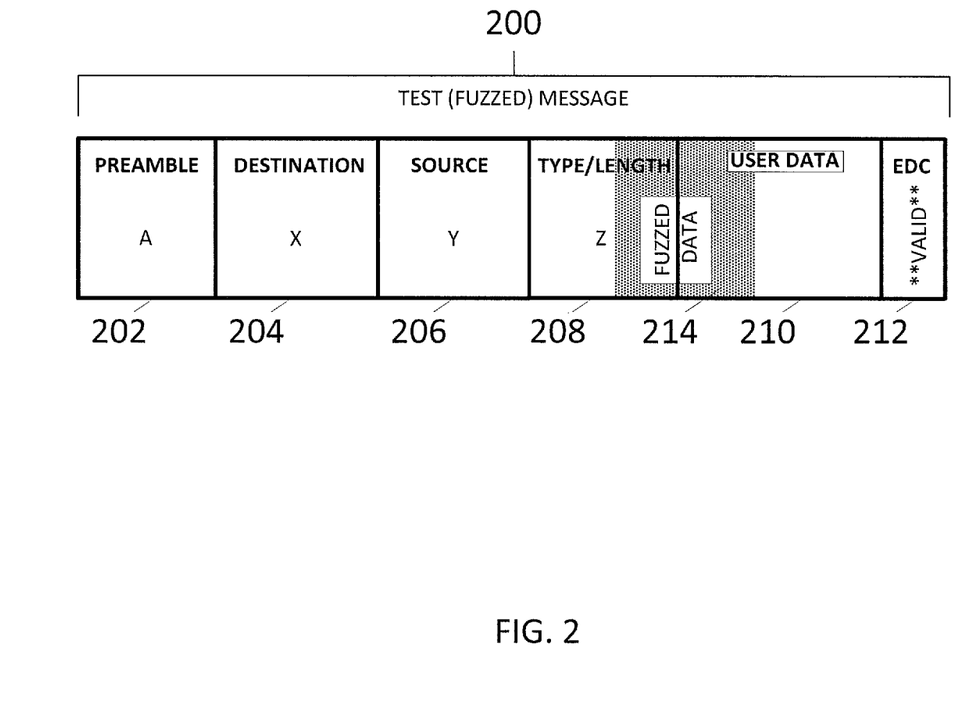
FIG. 2 is a diagram illustrating an exemplary test message according to an embodiment of the subject matter described herein.

FIG. 2 is a diagram illustrating an exemplary test message 200 according to an embodiment of the subject matter described herein. Test message 200 may represent any message (e.g., a PDU, a frame, or a packet) usable for testing DUT 106. Test message 200 may include fuzzed data and may be generated and sent to DUT 106 via FTM 102 and/or a related port (e.g., port 112). In some embodiments, test message 200 may conform to a specific protocol and/or may otherwise appear normal or valid. In some embodiments, test message 200 may not conform to a specific protocol and/or may otherwise appear abnormal or invalid.

Referring to FIG. 2, test message 200 may represent an Ethernet packet including a preamble 202, a destination address 204, a source address 206, a type or length parameter (TLP) value 208, user data 210, and/or an error detection code (EDC) 212. Preamble 202 may represent a seven octet (e.g., seven bytes) data portion indicating the start of an Ethernet packet. Destination address 204 may represent a six octet data portion indicating a media access control (MAC) address for a destination node. Source address 206 may represent a six octet data portion indicating a MAC address for a source node. TLP value 208 may represent a two octet data portion and may indicate a protocol encapsulated in the payload portion (e.g., user data 210) or may indicate the size of the payload in octets for the payload portion. User data 210 may represent a data portion (e.g., generally between 46 and 1500 octets in size) including payload information usable for various purposes. EDC 212 may represent a four octet data portion (e.g., a cyclic redundancy check (CRC)) usable for detecting data corruption associated with test message 200.

In some embodiments, test message 200 may include fuzzed data 214. Fuzzed data 214 may represent a data portion of various octets and may include any information for testing DUT 106 or related components or software therein. For example, fuzzed data 214 may include header information or portions therein, e.g., TLP value 208. In another example, fuzzed data 214 may include user data 210 or a portion therein.

In some embodiments, test message 200 may include indication information, also referred to herein as fuzzed message identification information, usable for identifying test message 200 as a test message and/or as containing fuzzed data 214. For example, a signature or other marker may be added or included in a header portion or payload portion of test message 200 in such a way that test message 200 still conforms to a relevant protocol. In this example, the signature or marker may indicate (e.g., to MDM 120 or another entity) that test message 120 includes fuzzed data 214. In some embodiments, indication information may also include state information or related information about fuzz testing. For example, the state information may include progress information about a current test being performed.

It will be appreciated that test message 200 is for illustrative purposes and that different and/or additional information may be included in test message 200.

Figure 3:
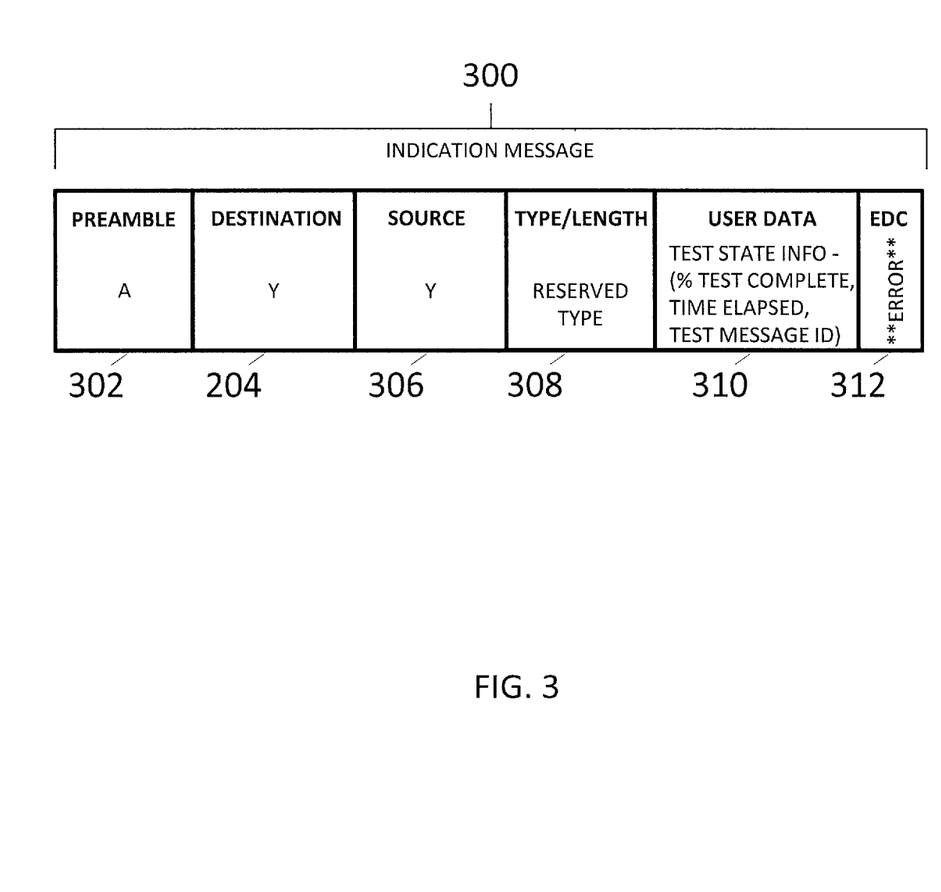
FIG. 3 is a diagram illustrating an exemplary indication message according to an embodiment of the subject matter described herein.

FIG. 3 is a diagram illustrating an exemplary indication message 300 according to an embodiment of the subject matter described herein. Indication message 300 may represent any message (e.g., a PDU, a frame, or a packet) usable for identifying or indicating that test message 200 is a test message and/or contains fuzzed data. For example, indication message 300 may be sent immediately after or immediately before test message 200. In this example, MDM 120 or another entity may be able to readily identify indication message 300 and, as such, identify test message 200, e.g., as the previous or subsequent message in a message flow. In another example, indication information in indication message 300 may be used to identify or indicate that test message 200 is a test message and/or contains fuzzed data. In some embodiments, indication message 300 may conform to a specific protocol and/or may otherwise appear normal or valid. In some embodiments, indication message 300 may not conform to a specific protocol and/or may otherwise appear abnormal or invalid.

Referring to FIG. 3, indication message 300 may represent an Ethernet packet including a preamble 302, a destination address 304, a source address 306, a TLP value 308, user data 310, and/or an EDC 312. Preamble 302 may represent a seven octet data portion indicating the start of an Ethernet packet. Destination address 304 may represent a six octet data portion indicating a MAC address for a destination node. Source address 306 may represent a six octet data portion indicating a MAC address for a source node. TLP value 308 may represent a two octet data portion and may indicate a protocol encapsulated in the payload portion (e.g., user data 310) or may indicate the size of the payload in octets for the payload portion. User data 310 may represent a data portion (e.g., generally between 46 and 1500 octets in size) including payload information usable for various purposes. EDC 312 may represent a four octet data portion (e.g., a CRC) usable for detecting data corruption associated with indication message 300.

In some embodiments, indication message 300 may be a special message not generated or sent during a normal transaction or message flow (e.g., transactions or message flows that do not include test message 200). For example, indication message 300 may include unique values for various parameters or header portions. In this example, EDC 312 may include or indicate a CRC error, source address 306 and destination address 304 may include or indicate identical information, and/or TLP value 308 may include or indicate a reserved type (e.g., a user-configurable Ethernet type).

In some embodiments, indication message 300 may be generated so as to minimize impact on DUT 106 and/or MDM 120. For example, if DUT 106 includes a layer 3 router, indication message 300 may be generated with certain parameter values or information that minimize impact on the layer 3 router, whereas if DUT 106 includes a layer 2 switch, indication message 300 may be generated with different or additional parameter values or information that minimize impact on the layer 2 switch. In some embodiments, processing of indication message 300 may have little or no effect on DUT 106 (e.g., minimal impact to DUT 106 with regard to a protocol or other aspects being tested). In some embodiments, generation, handling, and/or processing of indication message 300 may have little or no effect on a FTM 102 (e.g., minimal impact with regard to a tester's perspective, such as little to no increase in test duration or processing requirements).

In some embodiments, indication message 300 may include indication information usable for identifying test message 200 as a test message and/or as containing fuzzed data 214. Exemplary indication information may include a message ID, timestamp information, test statistics, state information associated with test message 200, and/or other information for identifying or indicating test message 200 is a test message and/or contains fuzzed data. For example, indication message 300 may include information about a number of fuzz occurrences prior to generating of indication message 300, information about fuzzed logic being implemented, a fuzzed portion ID, and/or other information related to testing.

In some embodiments, indication message 300 may include indication information usable for identifying issues with DUT 106. For example, if FTM 102 identifies that DUT 106 is experiencing issues, FTM 102 may generate indication message 300 containing TLP value 308 indicating a special reserved type value (e.g., ETH_TYPE_2). Otherwise (e.g., if FTM 102 does not detect issues with DUT 106), FTM 102 may generate indication message 300 containing TLP value 308 indicating a default reserved type value (e.g., ETH_TYPE_1). As such, while both reserved type values may be usable for identifying test message 200, the special reserved type value may act as a DUT behavior indicator usable for identifying the occurrence of a DUT related issue.

In some embodiments, indication information may also be usable for identifying a related session associated with a detected issue, information about the type of detected issue, and/or identify a test message related to (e.g., that caused or contributed to) the detected issue (e.g., by identifying a previous test message 200 generated from that same source address but having a default reserved type value).

In some embodiments, indication message 300 may conform to a specific protocol or standard such that MDM 120 or another entity can read or determine information about test message 200 or a related test. For example, MDM 120 (e.g., packet capture software) may be configured (e.g., via a dissector or decoder script) to analyze indication message 300 and display test related information to a test operator. By analyzing and/or using this information stored in indication message 300, a test operator may quickly identify test messages, including test messages that correspond to a DUT related issue.

In some embodiments, indication message 300 may be sent immediately after or immediately before sending test message 200. For example, where indication message 300 is sent immediately after test message 200, there may not be any other message between test message 200 and indication message 300. In this example, after testing is completed, a test operator may use MDM 120 (e.g., packet capture software) and find indication message 300 and, by finding the immediately preceding message, identify test message 200.

It will be appreciated that indication message 300 is for illustrative purposes and that different and/or additional information may be included in indication message 300.

Figure 4:
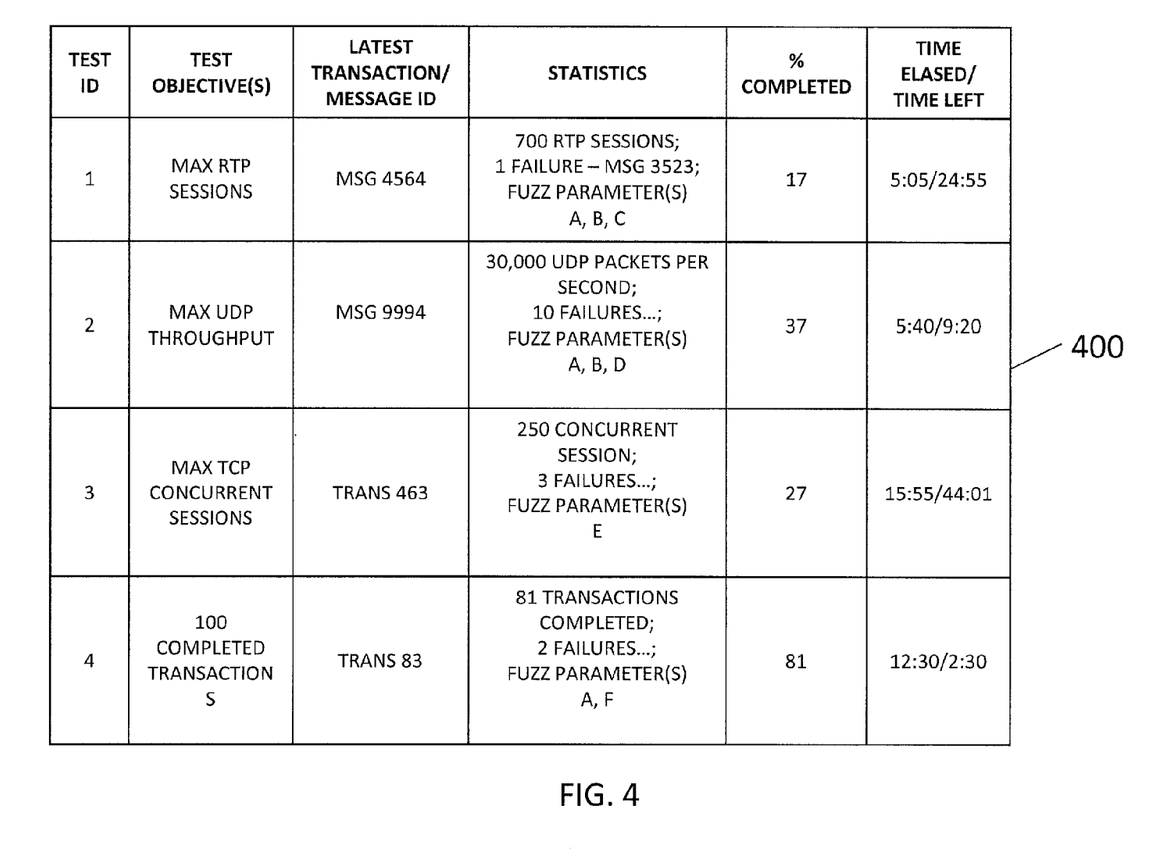
FIG. 4 is a diagram illustrating exemplary state information associated with fuzz testing according to an embodiment of the subject matter described herein.

FIG. 4 is a diagram illustrating exemplary state information associated with fuzz testing according to an embodiment of the subject matter described herein. In some embodiments, state information 400 may be located in FTM storage 108. In some embodiments, state information 400 may be accessed and/or stored by computing platform 100 and/or FTM 102 using various data structures.

Referring to FIG. 4, state information 400 may be depicted using a table representing associations between test related IDs (e.g., test IDs, message IDs, or fuzzed data IDs) and test related information (e.g., state information). The table depicted in FIG. 4 may include any information for performing, analyzing, reproducing, and/or observing fuzz testing.

In some embodiments, state information 400 may include a test ID that correlates one or more test objective(s). For example, a test objective may identify or indicate particular fuzzing logic (e.g., a test plan) to be implemented. The test ID may also correlate with a current message or transaction ID associated with a test. For example, the current message or transaction ID may indicate the most recent test message or transaction to occur during a given test. The test ID may also correlate with various statistics associated with a test. For example, the statistics may indicate particular parameters being fuzzed and/or a current tally of failures or issues experienced by DUT 106. The statistics may also indicate additional information about one or more failures, such as a message ID or a transaction associated with a given failure. The statistics may also indicate or include information related to the test objective(s), including current values, maximum values, and/or minimum. The test ID may also correlate with progress or replay related information, such as a completion percentage value and/or a time elapsed and/or time left until a test is complete.

In some embodiments, state information 400 may be usable for replaying, reproducing, and/or recreating a test related event. For example, FTM 102 may retrieve certain information about test "1", determine a particular message in test "1" that caused a failure, and reproduce that message in a subsequent test to determine whether the message causes another failure.

It will be appreciated that state information 400 in FIG. 4 is for illustrative purposes and that different and/or additional information may also be usable for providing fuzz testing functionality. Further, it will be appreciated that state information 400 may be stored in various data structures and/or in one or more locations.

Figure 5:
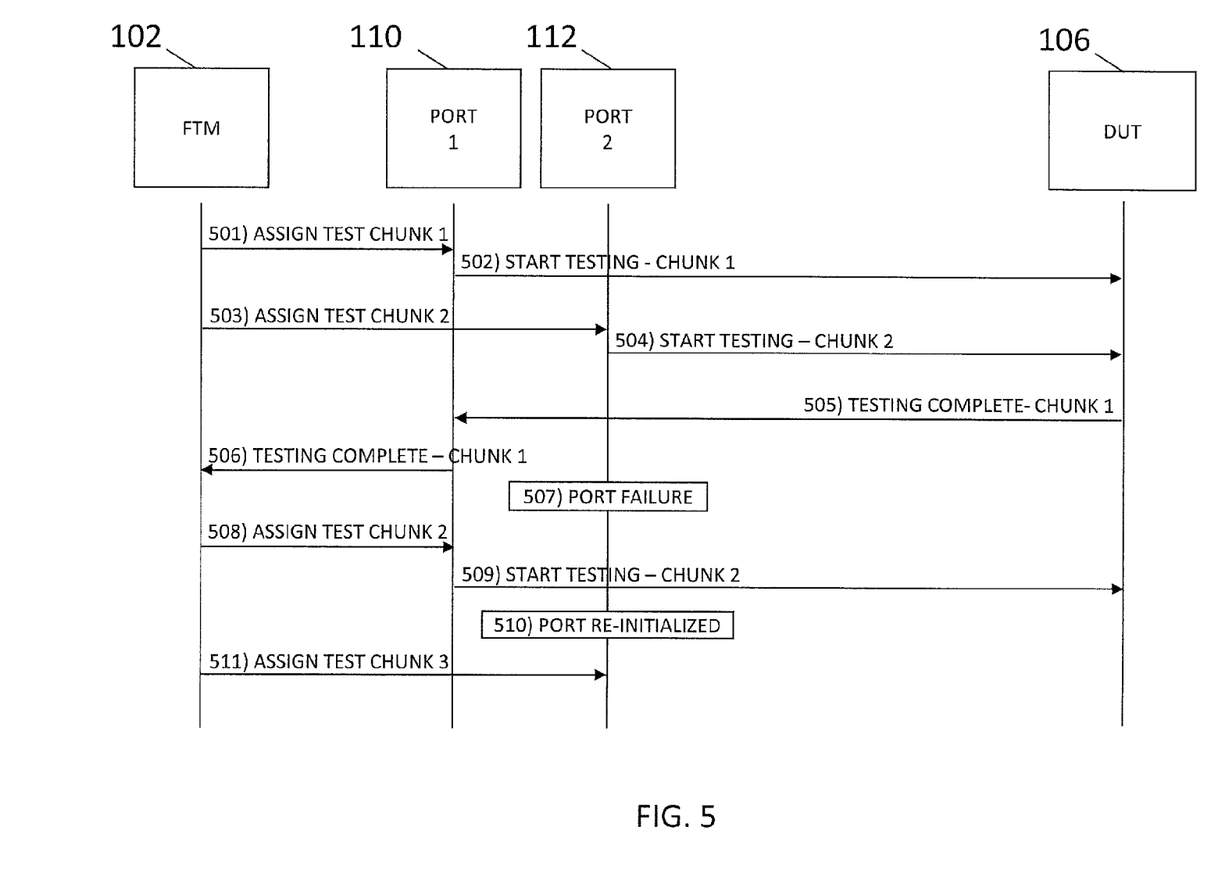
FIG. 5 is a diagram illustrating assigning test chunks to multiple ports according to an embodiment of the subject matter described herein.

FIG. 5 is a diagram illustrating assigning test chunks to multiple ports according to an embodiment of the subject matter described herein. In some embodiments, FTM 102 may receive instructions and/or configuration information for fuzz testing DUT 106. Using this information, FTM 102 may generate and/or select a test plan for achieving one or more test objective(s). FTM 102 may generate and distribute chunks of the test plan such that multiple resources are utilized in testing DUT 106.

Referring to FIG. 5, at step 501, a first test chunk may be assigned to port 110.

At step 502, port 110 may begin testing DUT 106 using the first test chunk. For example, the first test chunk may be for testing DUT 106 using an emulated user "John" and a certain set of transactions, where fuzzed data affects certain parameter values ("A" and "B") in various test messages.

At step 503, a second test chunk may be assigned to port 112. For example, the second test chunk may be for testing DUT 106 using an emulated user "Bob" and a certain set of transactions, where fuzzed data affects certain parameter values ("A" and "C") in various test messages.

At step 504, port 112 may begin testing DUT 106 using the second test chunk.

At step 505, port 110 may complete testing DUT 106 using the first test chunk.

At step 506, FTM 102 may determine that port 110 has completed testing using the first test chunk and is available for further testing.

At step 507, port 112 may fail while testing DUT 106 using the second test chunk.

In some embodiments, FTM 102 may become aware of the failure involving the second test chunk. For example, port 112 may send a failure message to FTM 112 indicating that a failure occurred during executing of the second test chunk. In another example, FTM 102 may exchange keep-alive messages with port 112 and, if a keep-alive response message is not received from port 112 within a certain time period, FTM 102 may assume that port 112 has failed.

At step 508, the second test chunk may be (re)assigned to port 110.

At step 509, port 110 may begin testing DUT 106 using the second test chunk.

At step 510, port 112 may be re-initialized or otherwise repaired so as to be capable of receiving test chunks and testing DUT 106.

At step 511, in response to determining that port 112 has been successfully re-initialized or repaired, a third test chunk may be assigned to port 112. For example, the third test chunk may be for testing DUT 106 using an emulated user "Tom" and a certain set of transactions, where fuzzed data affects certain parameter values ("B" and "C") in various test messages.

It will be appreciated that FTM 102 may continue assigning test chunks to available resources until all test chunks associated with a test plan have been executed or utilized. Further, it will be appreciated that steps 501-511 in FIG. 5 are for illustrative purposes. Moreover, it will be appreciated that different and/or additional steps than steps 501-511 described above may occur when using multiple resources for testing DUT 106.

Figure 6:
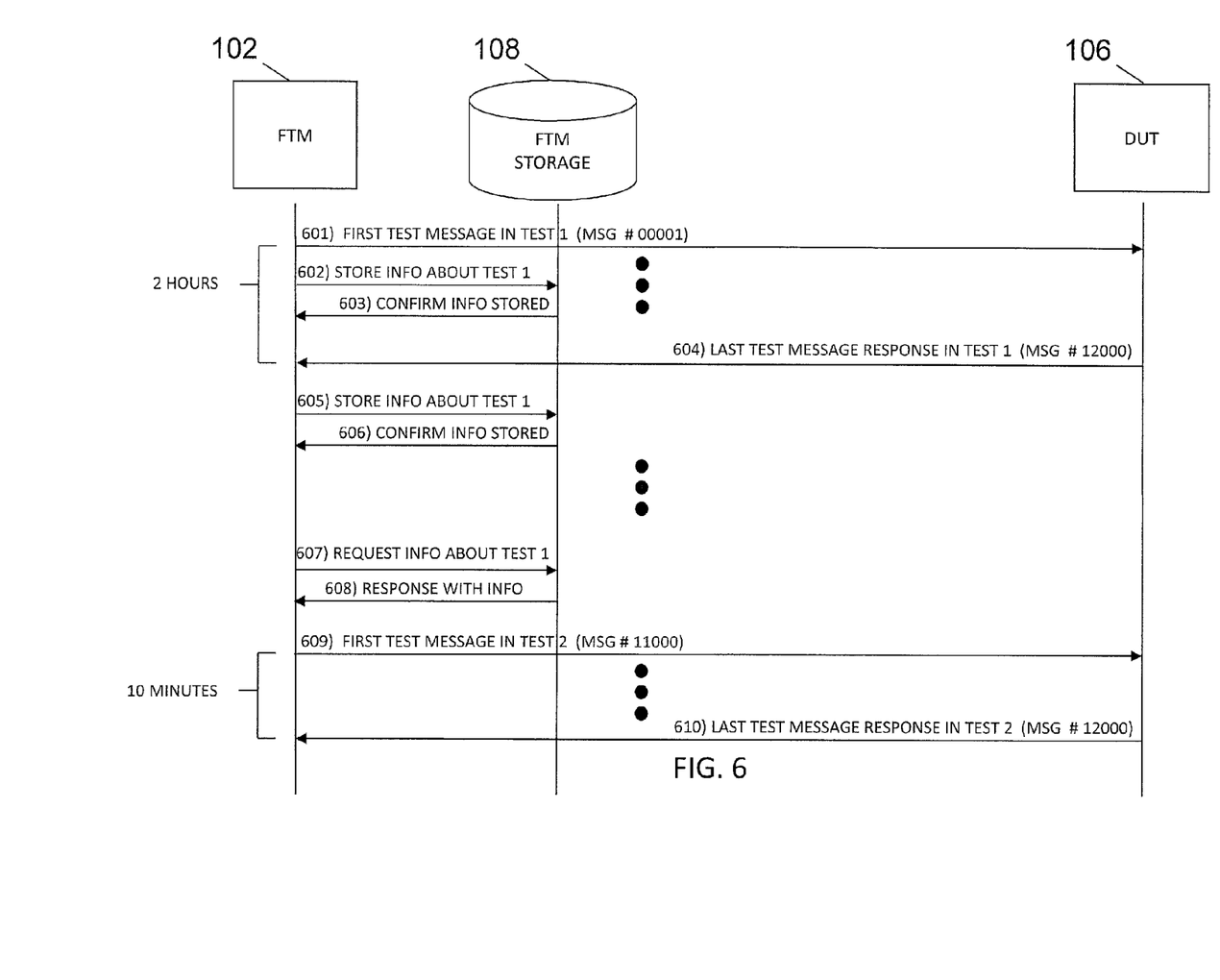
FIG. 6 is a diagram illustrating fuzz testing according to an embodiment of the subject matter described herein.

FIG. 6 is a diagram illustrating fuzz testing according to an embodiment of the subject matter described herein. In some embodiments, FTM 102 may be configured to store state information associated with testing DUT 106. In such embodiments, FTM 102 may use the stored state information to restore, reproduce, and/or replay test related events. For example, a fuzzed message that is generated near the end of a test may cause DUT 106 to crash. In this example, FTM 102 may use previously stored state information to generate the fuzzed message immediately at the start of a second test, thereby saving time and resources since the second test can essentially skip the messages generated before the fuzzed message that caused the crash.

Referring to FIG. 6, at step 601, FTM 102 may begin a first test by sending a first test message to DUT 106.

At step 602, FTM 102 may store state information about the first test in FTM storage 108.

At step 603, FTM storage 108 may indicate to FTM 102 that the state information has been successfully stored.

In some embodiments, FTM 102 may periodically or aperiodically store state information as the first test is performed. For example, statistics and current message IDs may be stored along with progress information and/or other information needed to reproduce a test related event.

At step 604, a first test may be completed when a last response message is sent from DUT 106 to FTM 102. For example, the first test may involve 12000 messages and may take two hours (120 minutes) to complete.

At step 605, FTM 102 may store additional state information about the first test in FTM storage 108.

At step 606, FTM storage 108 may indicate to FTM 102 that the additional state information has been successfully stored.

At some subsequent time, a second test may be performed. For example, a test operator may analyze data associated with the first test and determine a point of interest in the first test requiring additional analysis.

At step 607, FTM 102 may request state information about the first test. For example, FTM 102 may request state information for reproducing test related events that occurred around one hour and fifty minutes (110 minutes) into the first test.

At step 608, FTM storage 108 may provide the requested state information about the first test to FTM 102. For example, the requested state information may include a message ID indicating a test message that was generated and sent around one hour and fifty minutes (110 minutes) into the first test that caused on contributed to detected issues at DUT 106.

At step 609, FTM 102 may begin a second test by sending a first test message based on state information from the first test to DUT 106. For example, the first test message of the second test may be based on a message sent near the end of the first test that caused DUT 106 to crash.

At step 610, the second test may be completed when a last response message is sent from DUT 106 to FTM 102. For example, since the second test starts with a message based on a message sent near the end of the first test, the second test may be completed in a fraction of time as compared to the first test, e.g., 10 minutes versus 120 minutes.

It will be appreciated that steps 601-610 in FIG. 6 are for illustrative purposes. Further, it will be appreciated that different and/or additional steps than steps 601-610 described above may occur when using stored state information when testing DUT 106.

Figure 7:
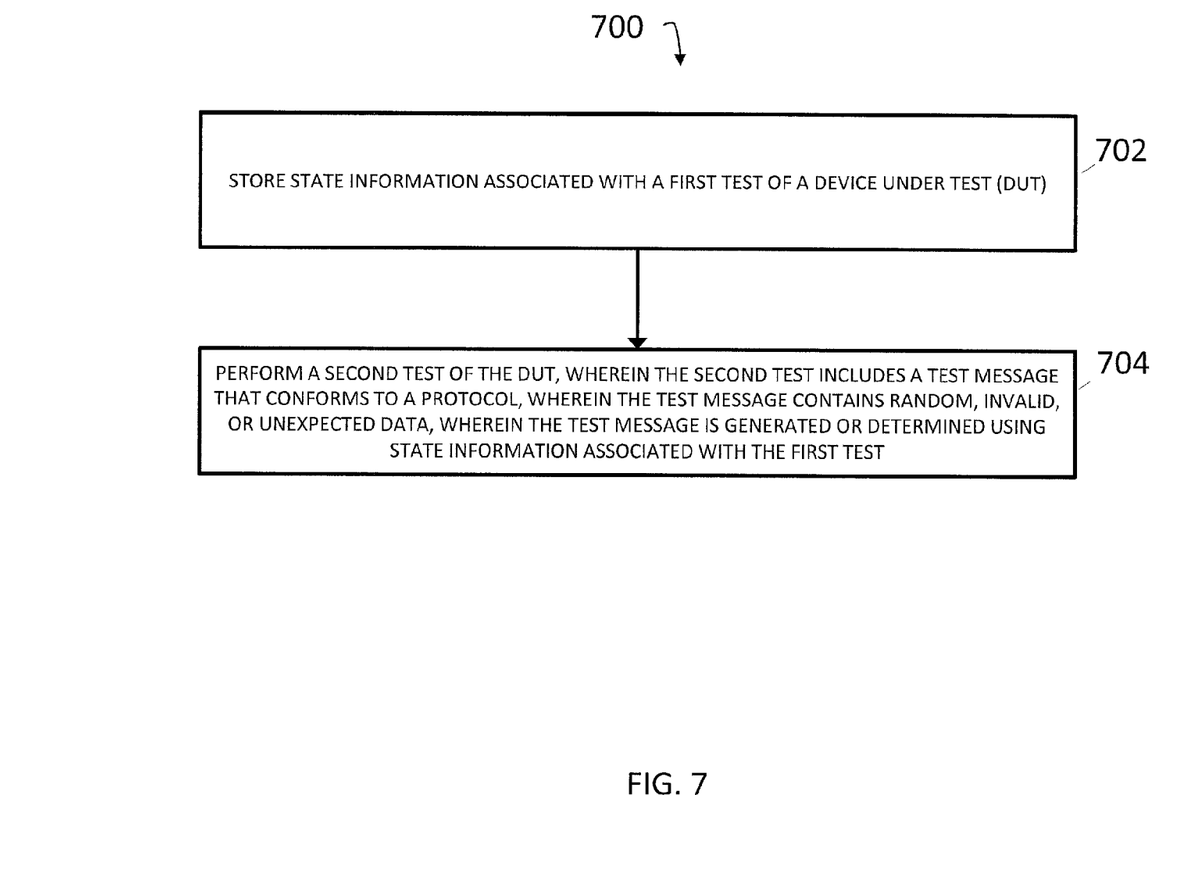
FIG. 7 is a diagram illustrating an exemplary process for testing one or more device(s) under test (DUT) according to an embodiment of the subject matter described herein.

FIG. 7 is a diagram illustrating an exemplary process 700 for testing DUT 106 according to an embodiment of the subject matter described herein. In some embodiments, exemplary process 700, or portions thereof, may be performed by or at computing platform 100, FTM 102, port 110, port 112, port 114, MDM 120, and/or another node or module.

At step 702, state information associated with a first test of DUT 106 may be stored. For example, FTM 102 may periodically or aperiodically (e.g., dynamically) store state information and/or related information at FTM storage 108.

In some embodiments, state information may include information for reproducing one or more test related events.

In some embodiments, state information may be stored in response to detecting that DUT 106 is experiencing issues.

In some embodiments, state information may be stored in response to generating or sending a test message.

At step 704, a second test of DUT 106 may be performed. The second test may include a test message that conforms to a protocol. The test message may contain random, invalid, or unexpected data and may be generated or determined using state information associated with the first test. For example, after analyzing results for a first test lasting two hours, a test operator may want to replay or reproduce the last 10 minutes of the first test, FTM 102 may query FTM storage 108 and retrieve the necessary state information such that the second test can be a reproduction of the last 10 minutes of the first test, e.g., without having to start the second test from the beginning and waiting an hour and 50 minutes until the point of interest.

In some embodiments, test messages in a second test may include identical information as corresponding test messages in a first test.

In some embodiments, test messages in a second test may include different information than corresponding test messages in a first test. For example, FTM 102 may use stored state information to identify test message 200 in a first test and may generate multiple versions of test message 200, each having different fuzzed parameter values. In this example, a second test may send the different versions of test message 200 to see if DUT experiences issues with one or more of these different versions of test message 200.

Figure 8:
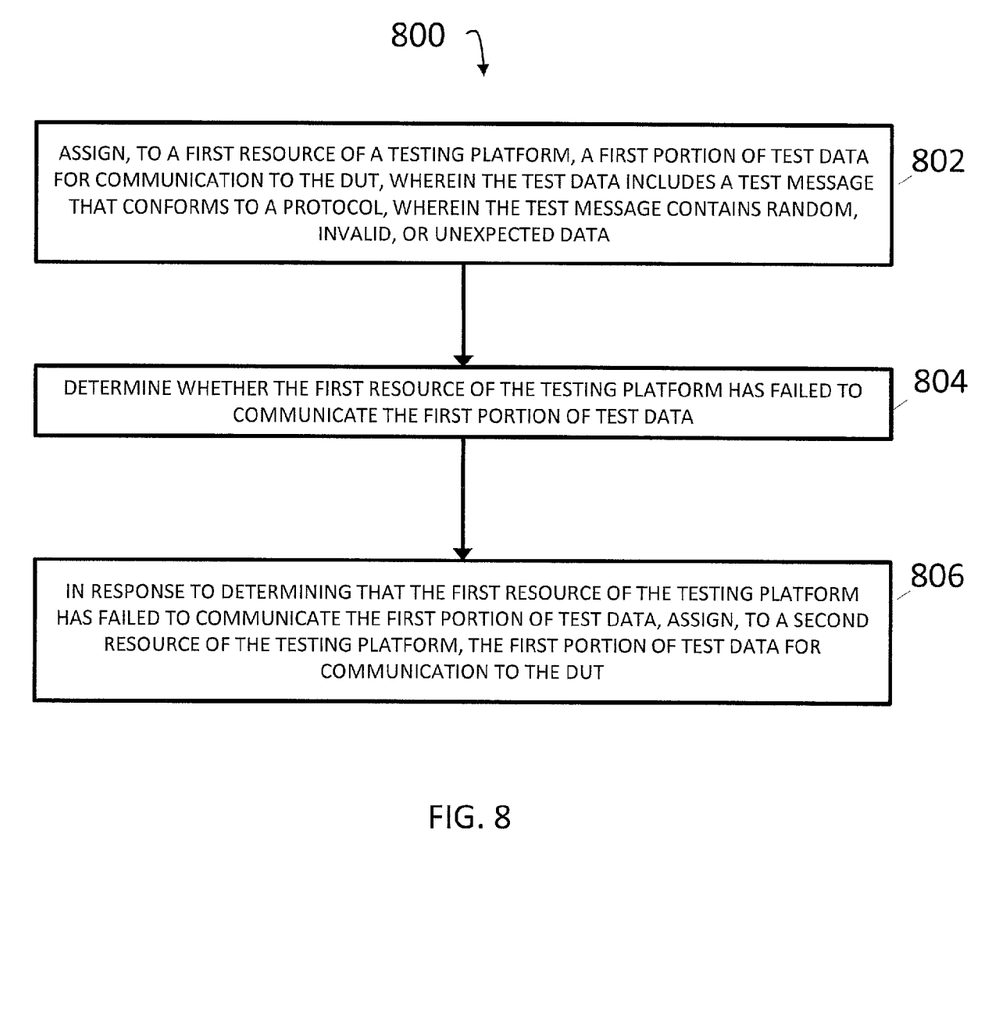
FIG. 8 is a diagram illustrating an exemplary process for testing one or more DUT according to another embodiment of the subject matter described herein.

FIG. 8 is a diagram illustrating an exemplary process 800 for testing DUT 106 according to another embodiment of the subject matter described herein. In some embodiments, exemplary process 800, or portions thereof, may be performed by or at computing platform 100, FTM 102, port 110, port 112, port 114, MDM 120, and/or another node or module.

At step 802, a first portion of test data for communication to DUT 106 may be assigned to a first resource. The test data may include a test message that conforms to a protocol and the test message may contain random, invalid, or unexpected data. For example, test data may represent a test plan that includes multiple test messages to be sent to DUT 106 for testing purposes. In this example, a first portion of test data may include test message 200 which may include fuzzed data associated with one or more parameters. Continuing with this example, FTM 102 may assign the first portion to port 110 and assign a second portion of test data to port 112.

At step 804, it may be determined whether the first resource of the testing platform has failed to communicate the first portion of test data. For example, during testing, port 110 may determine that a failure has occurred and may report the failure to FTM 102 and/or another entity. In another example, FTM 102 and/or another entity may detect that a failure has occurred at port 110, e.g., via heartbeat exchange messages or lack thereof.

At step 806, in response to determining that the first resource of the testing platform has failed to communicate the first portion of test data, the first portion of test data for communication to DUT 106 may be assigned to a second resource of the testing platform. For example, FTM 102 may assign the first portion or some of the first portion to port 114.

In some embodiments, a failed resource may not assigned a test portion unless the failed resource is re-initialized or repaired to a working or functional state.

In some embodiments, a failed resource may be re-initialized or repaired. For example, FTM 102 may repair a failed resource to a working or functional state.

In some embodiments, in response to re-initializing or repairing a failed resource, the repaired resource may be assigned another test portion.

Figure 9:
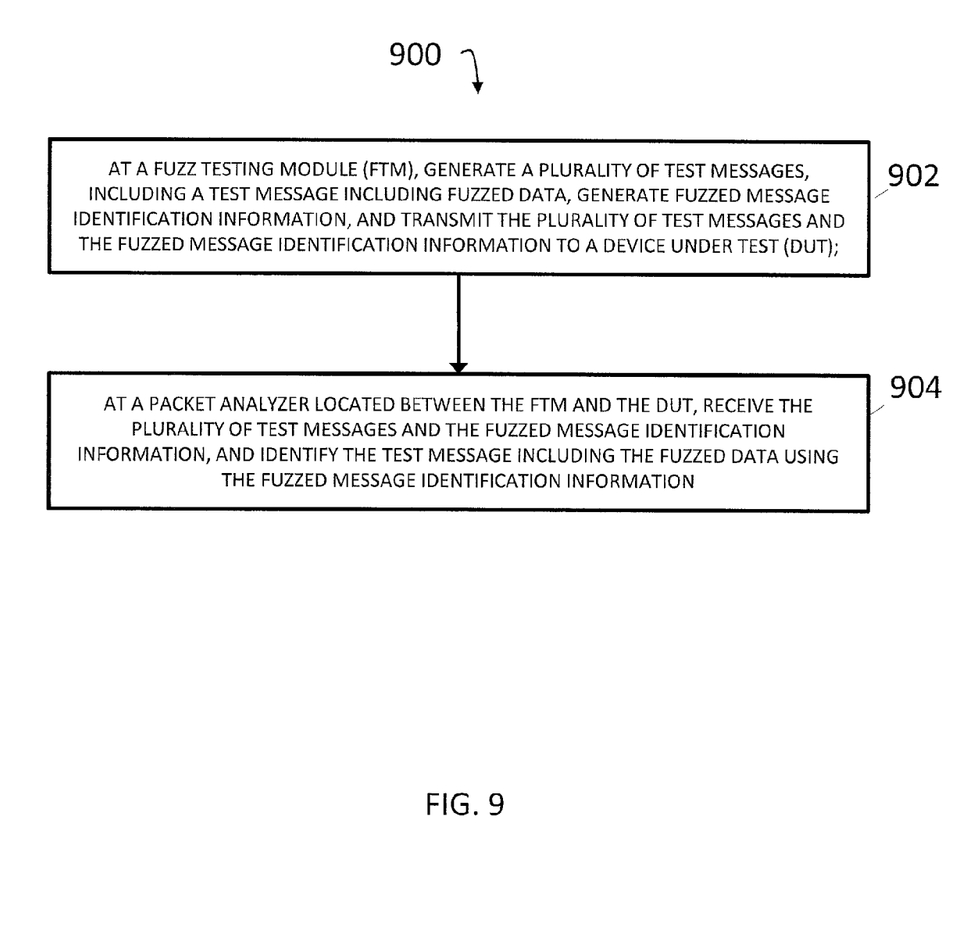
FIG. 9 is a diagram illustrating an exemplary process for identifying a test message according to an embodiment of the subject matter described herein.

FIG. 9 is a diagram illustrating an exemplary process 900 for identifying a test message according to an embodiment of the subject matter described herein. In some embodiments, exemplary process 900, or portions thereof, may be performed by or at computing platform 100, FTM 102, port 110, port 112, port 114, MDM 120, and/or another node or module.

At step 902, at FTM 102, a plurality of test messages may be generated, including a test message including fuzzed data, fuzzed message identification information may be generated, and the plurality of test messages and the fuzzed message identification information may be transmitted to DUT 106. For example, FTM 102 may send a plurality of test messages, including test message 200 and indication message 300 to DUT 106.

At step 904, at a packet analyzer located between the FTM and the DUT, the plurality of test messages and the fuzzed message identification information (e.g., indication information) may be received and the test message including the fuzzed data may be identified using the fuzzed message identification information. For example, MDM 120 may use a message ID, a timestamp, or other indication information to identify test message 200.

In some embodiments, fuzzed message identification information may be received after sending a test message and/or after receiving, from DUT 106, a response message corresponding to the test message.

In some embodiments, fuzzed message identification information may be sent in a test message including fuzzed data or in a separate message distinct from the test message including fuzzed data.

In some embodiments, fuzzed message identification information or a related message (e.g., indication message 300) may be discarded or prevented from reaching DUT 106 by a packet analyzer (e.g., MDM 120).

In some embodiments, fuzzed message identification information may include a number of fuzz occurrences prior to generating of the indication information, an ID for indicating fuzz logic implemented, a fuzzed portion ID, and/or a behavior indicator indicating whether the DUT is experiencing issues.

In some embodiments, fuzzed message identification information may have little or no effect on testing of the DUT. For example, indication information and/or a related indication message may be ignored or discarded by DUT 106.

In some embodiments, state information associated with testing DUT 106 may be stored and used to replay or reproduce a test related event.

In some embodiments, portions of a test (e.g., test chunks) may be assigned among multiple resources (e.g., port 110, port 112, and/or port 114) for testing DUT 108, wherein if a first resource of the multiple resources fails to execute a first portion, the first portion may be reassigned to a second resource of the multiple resources for execution.

In some embodiments, a failed resource may be re-initialized or repaired. For example, FTM 102 may repair a failed resource to a working or functional state.

In some embodiments, a second portion for execution may be assigned to a resource that previously failed, e.g., if the previously failed resource is repaired or re-initialized.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for identifying a test message, the method comprising:
at a fuzz testing module (FTM):
generating a plurality of test messages, wherein the plurality of test messages includes a test message containing fuzzed data,
generating an indication message including fuzzed message identification information, wherein the fuzzed message identification information in the indication message identifies the test message in the plurality of test messages as containing fuzzed data, and
transmitting the test messages and the indication message to a device under test (DUT), wherein the indication message is a separate message distinct from the test message containing the fuzzed data; and
at a packet analyzer located between the FTM and the DUT:
receiving the test messages and the indication message, and
identifying the test message including fuzzed data using the fuzzed message identification information in the indication message.

2. The method of claim 1 wherein the indication message is received immediately before or after the test message including the fuzzed data.

3. The method of claim 1 wherein the fuzzed message identification information includes a message identifier indicating the test message, a timestamp indicating the test message, test statistics, a number of fuzz occurrences prior to generating of the fuzzed message identification information, an identifier for indicating fuzz logic, a fuzzed portion identifier, or a behavior indicator indicating whether the DUT is experiencing issues.

4. The method of claim 1 wherein the indication message has little or no effect on testing of the DUT.

5. The method of claim 1 wherein the indication message is discarded or prevented from reaching the DUT by the packet analyzer.

6. The method of claim 1 comprising:
storing state information associated with testing the DUT; and
using the state information to replay or reproduce a test related event.

7. The method of claim 1 comprising:
assigning portions of a test for testing the DUT among multiple resources, wherein if a first resource of the multiple resources fails to execute a first portion, the first portion is reassigned to a second resource of the multiple resources for execution.

8. The method of claim 7 comprising:
repairing or re-initializing the first resource; and
in response to repairing or re-initializing the first resource, assigning a second portion for execution to the first resource.

9. A system for identifying a test message, the system comprising:
a first processor;
a second processor;
a fuzz testing module (FTM) implemented using software executed by at least the first processor, wherein the FTM is configured to generate a plurality of test messages, wherein the plurality of test messages includes a test message containing fuzzed data, to generate an indication message including fuzzed message identification information, wherein the fuzzed message identification information in the indication message identifies the test message in the plurality of test messages as containing fuzzed data, and to transmit the plurality of test messages and the indication message to a device under test (DUT), wherein the indication message is a separate message distinct from the test message containing the fuzzed data; and
a packet analyzer implemented using software executed by at least the second processor, wherein the packet analyzer is located between the FTM and the DUT, the packet analyzer configured to receive the plurality of test messages and the indication message and to identify the test message including fuzzed data using the fuzzed message identification information in the indication message.

10. The system of claim 9 wherein the indication message is received immediately before or after the test message including the fuzzed data.

11. The system of claim 9 wherein the fuzzed message identification information includes a message identifier indicating the test message, a timestamp indicating the test message, test statistics, a number of fuzz occurrences prior to generating of the fuzzed message identification information, an identifier for indicating fuzz logic, a fuzzed portion identifier, or a behavior indicator indicating whether the DUT is experiencing issues.

12. The system of claim 9 wherein the indication message has little to no effect on testing of the DUT.

13. The system of claim 9 wherein the packet analyzer is configured to discard or prevent the indication message from reaching the DUT.

14. The system of claim 9 wherein the FTM is configured to store state information associated with testing the DUT and to use the state information to replay or reproduce a test related event.

15. The system of claim 9 wherein the FTM is configured to assign portions of a test for testing the DUT among multiple resources, wherein if a first resource of the multiple resources fails to execute a first portion, the first portion is reassigned to a second resource of the multiple resources for execution.

16. The system of claim 15 wherein the FTM is configured to repair or re-initialize the first resource and, in response to repairing or re-initializing the first resource, to assign a second portion for execution to the first resource.

17. A non-transitory computer readable medium comprising computer executable instructions embodied in the non-transitory computer readable medium that when executed by a processor of a computer perform steps comprising:
   at a fuzz testing module (FTM):
      generating a plurality of test messages, wherein the plurality of test messages includes a test message containing fuzzed data,
      generating an indication message including fuzzed message identification information, wherein the fuzzed message identification information in the indication message identifies the test message in the plurality of test messages as containing fuzzed data, and
      transmitting the test messages and the indication message to a device under test (DUT), wherein the indication message is sent in a separate message distinct from the test message containing the fuzzed data; and
   at a packet analyzer located between the FTM and the DUT:
      receiving the test messages and the indication message, and
      identifying the test message including fuzzed data using the fuzzed message identification information in the indication message.

18. The non-transitory computer readable medium of claim 17 wherein the message indication message is received immediately before or after the test message including the fuzzed data.

* * * * *